US008448069B2

(12) United States Patent
McKnight (10) Patent No.: US 8,448,069 B2
(45) Date of Patent: May 21, 2013

(54) OBJECT SET PROPERTY VIEWER

(75) Inventor: David Kenneth McKnight, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 2727 days.

(21) Appl. No.: 10/831,060

(22) Filed: Apr. 23, 2004

(65) Prior Publication Data

US 2005/0240901 A1      Oct. 27, 2005

(51) Int. Cl.
*G06F 3/00*         (2006.01)

(52) U.S. Cl.
USPC ........... 715/733; 715/736; 715/740; 715/800; 715/810

(58) Field of Classification Search
USPC ............... 715/503, 509, 700, 712, 734–747, 715/703, 709, 205, 209, 733, 800, 810
See application file for complete search history.

(56) References Cited

U.S. PATENT DOCUMENTS

| | | | |
|---|---|---|---|
| 5,410,648 A | 4/1995 | Pazel | 345/777 |
| 5,546,519 A | 8/1996 | Berry | 345/763 |
| 5,572,644 A | 11/1996 | Liaw et al. | 715/531 |
| 5,664,127 A | 9/1997 | Anderson et al. | 345/777 |
| 5,852,411 A | 12/1998 | Jacobs et al. | 340/932.2 |
| 5,873,108 A | 2/1999 | Goyal et al. | 345/777 |
| 6,282,551 B1 | 8/2001 | Anderson et al. | 345/777 |
| 6,323,883 B1 | 11/2001 | Minoura et al. | 345/777 |
| 6,417,482 B1 | 7/2002 | Gysi | 345/777 |
| 6,437,810 B1 | 8/2002 | Nakajima et al. | 345/804 |
| 6,515,684 B1 | 2/2003 | Knodt | 345/777 |
| 6,754,885 B1 * | 6/2004 | Dardinski et al. | 717/113 |
| 6,788,315 B1 * | 9/2004 | Kekic et al. | 715/733 |
| 7,257,571 B2 * | 8/2007 | Turski et al. | 1/1 |
| 2001/0026289 A1 | 10/2001 | Sugiyama et al. | 345/804 |
| 2002/0093537 A1 | 7/2002 | Bocioned et al. | 345/777 |
| 2003/0063124 A1 | 4/2003 | Melhem et al. | 345/777 |
| 2003/0081007 A1 | 5/2003 | Cyr et al. | 345/804 |
| 2004/0255239 A1 * | 12/2004 | Bhatt et al. | 715/505 |

OTHER PUBLICATIONS

Wang et.al., "An Infrastructure to Implement Property Sheet Designs Efficiently", RD, n452, Dec. 2001, Article 160, p. 2142.
Banda et.al., "User Defined Views of Folder Objects", IBM TDB, v37, n12, Dec. 1994, p. 557-8.
Beisiegel et.al., "View Editor", IBM TDB, v37, n2B, 2/94, p. 73-77.

* cited by examiner

*Primary Examiner* — Doon Chow
*Assistant Examiner* — Linh K Pham
(74) *Attorney, Agent, or Firm* — Steven M. Greenberg, Esq.; Carey, Rodriguez, Greenberg & O'Keefe (57) ABSTRACT

A computer system, a method, and a computer application that creates a view of the properties of a set of objects that have a common property adapter. A user may select some or all of the objects and some or all of the properties to include in the view created by the object set property view. Upon selection of an object by a user, the method and application retrieve the children of the object using a preexisting content adapter. The object set property viewer then ascertains if the children have the same property adapter, also preexisting. If so, the property adapter is retrieved, along with the associated property descriptors and functions of the adapter. The object set property viewer creates a new view, preferably in the form of a table wherein the rows (columns) are of the children objects and the columns (rows) are of the properties of interest. Because of inheritance, and functionality associated with the property is also inherited so that the object set property view may permit a user to sort, align, and/or edit the values of the properties.

16 Claims, 5 Drawing Sheets

| Remote Systems | Team | |
|---|---|---|
| Properties | | |
| Property | Value | |
| Filter string | d:\examples\* | 172 |
| Hidden | No | 174 |
| Last Modi. | Day/Month/Year Time | 176 |
| Location | d:\examples | 178 |
| Name | ASFormatter.cpp | 180 |
| Number. | 0 | 182 |
| Read-onl. | No | 184 |
| Size | 51,429 bytes | 186 |
| Type | File | 188 |

| Remote Systems | Team | | | | |
|---|---|---|---|---|---|
| ↓ File filter examples | | | | | |
| Name | Location | Last modified | Size | Read-only? | Hidden? |
| ASFormatter.cpp | d:\examples | Day/Month/Year/Time | 51429 bytes | No | No |
| testblank | d:\examples | Day/Month/Year/Time | 51525 bytes | No | No |
| payclass.hpp | d:\examples | Day/Month/Year/Time | 3884 bytes | No | No |
| base64.c | d:\examples | Day/Month/Year/Time | 2994 bytes | No | No |
| pcm14.rpgle | d:\examples | Day/Month/Year/Time | 2228 bytes | No | No |
| astyle2 | d:\examples | Day/Month/Year/Time | 0 bytes | No | No |
| bug | d:\examples | Day/Month/Year/Time | 0 bytes | No | No |
| demo | d:\examples | Day/Month/Year/Time | 0 bytes | No | No |
| fetchmail | d:\examples | Day/Month/Year/Time | 0 bytes | No | No |
| inter | d:\examples | Day/Month/Year/Time | 0 bytes | No | No |

OBJECT SET PROPERTY VIEWER

BACKGROUND OF THE INVENTION

This invention relates generally to computer graphical user interfaces, and more particularly relates to a graphical user interface having an object viewer that allows a user to view and edit multiple objects having the same properties.

Software developers typically have all the tools used by the developer to generate software under one umbrella, called an integrated development environment (IDE). IDEs provide an environment wherein the appropriate tools needed for source code editing, compiling, linking, testing, debugging, and profiling are comprehensively integrated. The IDE allows the developer to move from one phase of code development to another. Typically IDEs track code generation and, at the appropriate phase, invoke the necessary tool. There are many IDEs that can build, edit, compile, dynamically and statically analyze programs, configure, browse for source code, and debug, etc. An IDE called Eclipse may be used in a myriad of computer languages for software development.

Application program interfaces (APIs) allow software developers to use the many functions inherent in a computer and operating system without having to directly keep track of all the details of a computer and its operating system. The operating system, connected to drivers for the various hardware subsystems, manages the changing details of the hardware; the programmer simply writes code for the API and trusts the operating system to create a file that allows random access to its data, obtain the location of the first available free storage location in the disk drive or other memory, write the file identifier at the beginning of the file, set up the permissions, and include other information that binds the file to the application. Just as the API provides a consistent way for applications to use the resources of the computer system, a user interface (UI), such as a graphical user interface (GUI), brings structure to the interaction between a user and the computer. The user interface is a program or set of programs that sits as a layer above the operating system itself.

The way an operating system knows about the data in the computer is by metadata. Metadata is data about data and is distinct from the data itself. Within the computer industry, the most common domain of metadata is the file system. Files contain data along with the data's metadata. Metadata may be immutable or independent, and metadata may further be essential or nonessential.

Immutable metadata changes only when the data itself changes. The nature of the file's data is immutable metadata and refers to the file's content type or type, such as whether the file is executable, image, audio, video, text, etc. and/or specific file formats such as JPEG, AIFF, MPEG2, etc., or even very specific versions of particular formats. A file's type, by definition, cannot change unless the data itself also changes. One case where immutable metadata may change without requiring a change to the data itself is a change, either an increase or decrease, of the file's accuracy. Data about modification of the file is mutable metadata whose accuracy can also increase to, for instance, the millisecond when the file was changed.

Independent metadata, the most common type of metadata, may change regardless of whether the data in the file also changes; for instance, changing the number of permissible users or changing a file's location does not necessarily change the actual data within the file. Creation date and possibly the last access data, assuming read-only access, also may change without changing the data.

Essential metadata is required to access a file, vis a vis a file's name, location, and size are essential metadata because the file cannot be used without them. Metadata is nonessential if the file's data can be retrieved and stored without knowledge of the file type metadata. File dates are nonessential metadata; there are many dates to associate with a file. File creation date, date of last data modification, date of last metadata modification, date of last data access, etc. File permissions inform the operating system and the user who can read this file, who can write to the file, who can execute the file, etc. Permissions and ownership metadata are nonessential and are determined by the security model of the operating system: user/group id numbers, permission bit masks, access control lists, etc. Permissions are usually stored on object systems and intended to be used with networked and/or multi-user operating systems. Because file date storage is so common, there is almost always a logical home for permissions to be stored with the file dates in the dedicated metadata structures of the file system. File ownership usually accompanies file permissions. Unix, for example, traditionally regulates file access by assigning rights to the file's owner, the file's group, and everyone else. In such an implementation, the permissions metadata is useless without the owner and group metadata.

Figure 1:
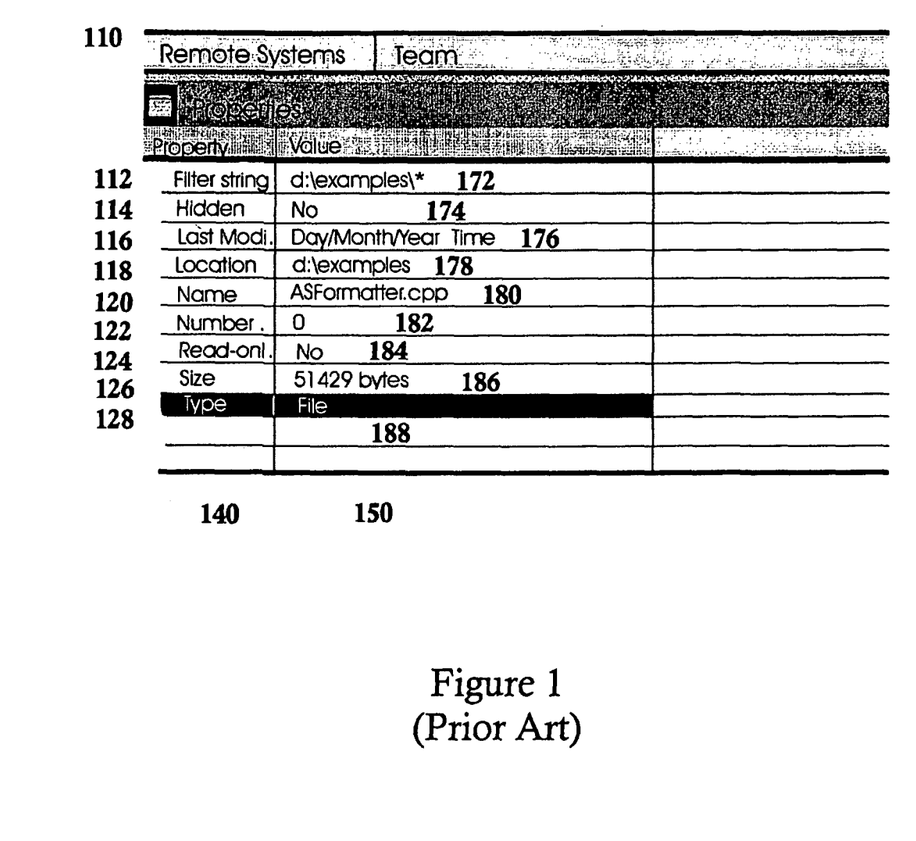
FIG. 1 is a view of a conventional graphical user interface of a property view that displays properties of a file in a computer software system.

A property viewer is a graphical user interface that displays the properties, attributes, or details of a file. It is sometimes called an attributes or a details viewer. A typical object is an arrangement of data, such as a file, and typical properties may include the object's metadata. A typical property viewer 110, as in FIG. 1, presents a table for each object; in this case the object's name is ASFormatter.cpp, set forth at 120 and is an object of the type "file," as set forth in 128. The table typically has two columns: cells in the first column 140 set forth the name of the property; and cells in the second column 150 describe the value of that named property. In FIG. 1, the properties and the respective values of the object are: filter string 112 d:/examples/* 172, that the object is not hidden 114, 174; the date of last modification 116—Day/Month/Year Time 176; the object's location 118 at d:/examples 178; the object's name 120 ASFormatter.cpp 180; the number of children 122 being zero 182; that the object is not a read-only file 124, 184; the size of the object 126 being 51429 bytes 186; and the type of object is a file 128, 188. The type of the input object to a property viewer determines what properties are to be displayed. Generally the properties viewer provides a means of editing particular properties, i.e., the values of the object's properties.

The properties viewer of FIG. 1 is generic, meaning that any user interface object can use the properties viewer so long as the object implements or accesses a property adapter. A property adapter is an application program interface or program driver for a property view. The property adapter obtains the property descriptors, provides access to the property values, and allows a software developer or user to set or edit the property value for a type of object. Using the common interface, the property viewer displays and allows a user to edit property information.

Figure 2:
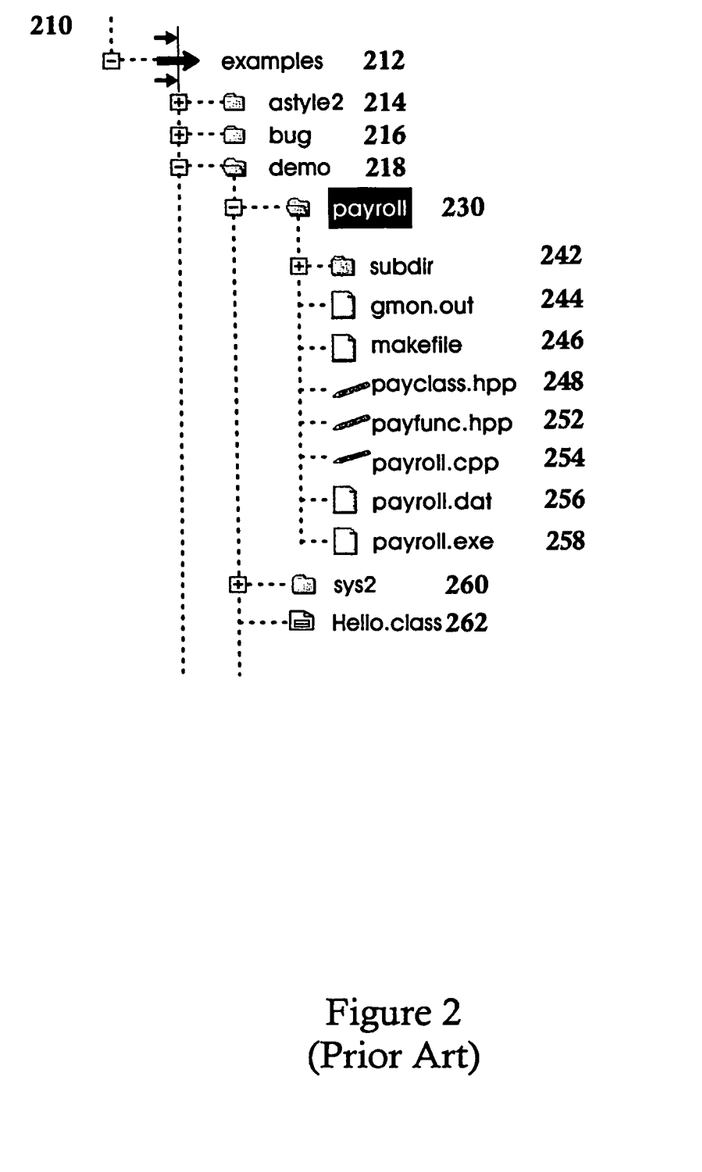
FIG. 2 is a view of a conventional graphical user interface of a hierarchical tree content view.

A content viewer is a viewer that displays the contents or data of objects. In the same way that a property viewer uses property adapters, a content viewer uses content adapters to determine how to display the content of an object. One example of a traditional content viewer is a hierarchical tree viewer as in FIG. 2 to display the children or the content of a particular parent node. In FIG. 2, the objects are nested within the hierarchical tree 210 and include file objects gmon.out 244, makefile 246, payroll.dat 256, and payroll.exe 258. Then, there are three other objects payclass.hpp 248, payfunc.hpp 252, and payroll.cpp 254. All these objects are in a file payroll 230, which is also considered an object. Payroll 230 and sys2 260 are children of demo 218, which, along with objects bug 216, astyle2 214, are children of the object examples 212.

User interface objects may use both a property adapter and a content adapter, shown respectively in FIGS. 1 and 2. The viewer determines which adapter to use, i.e., the property viewer uses a selected object's property adapter to display properties of the object. A content viewer uses the selected object's content adapter to display its content, sometimes referred to as the object's children. But it is often useful to be able to compare properties of a family of objects. Previously, a user had a choice to see the children of an object and then to open up each child to determine if one child had any properties in common with other children of the same object; that is, a user could either look at an object's content or she/he could look at the properties of individual objects—but not both.

BRIEF SUMMARY OF THE INVENTION

According to one aspect of the present invention, a method for displaying objects and properties of the objects in a computer object set comprises capturing an input of a selected object to view, determining if the selected object has a content adapter and if so, retrieving the content view generated by the content adapter, determining if other objects in the content view have a same property adapter and if so, retrieving the property adapter, obtaining at least one property descriptor and its corresponding property value of the objects from the property adapter, and creating an object set property view of the objects and the properties of the objects.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
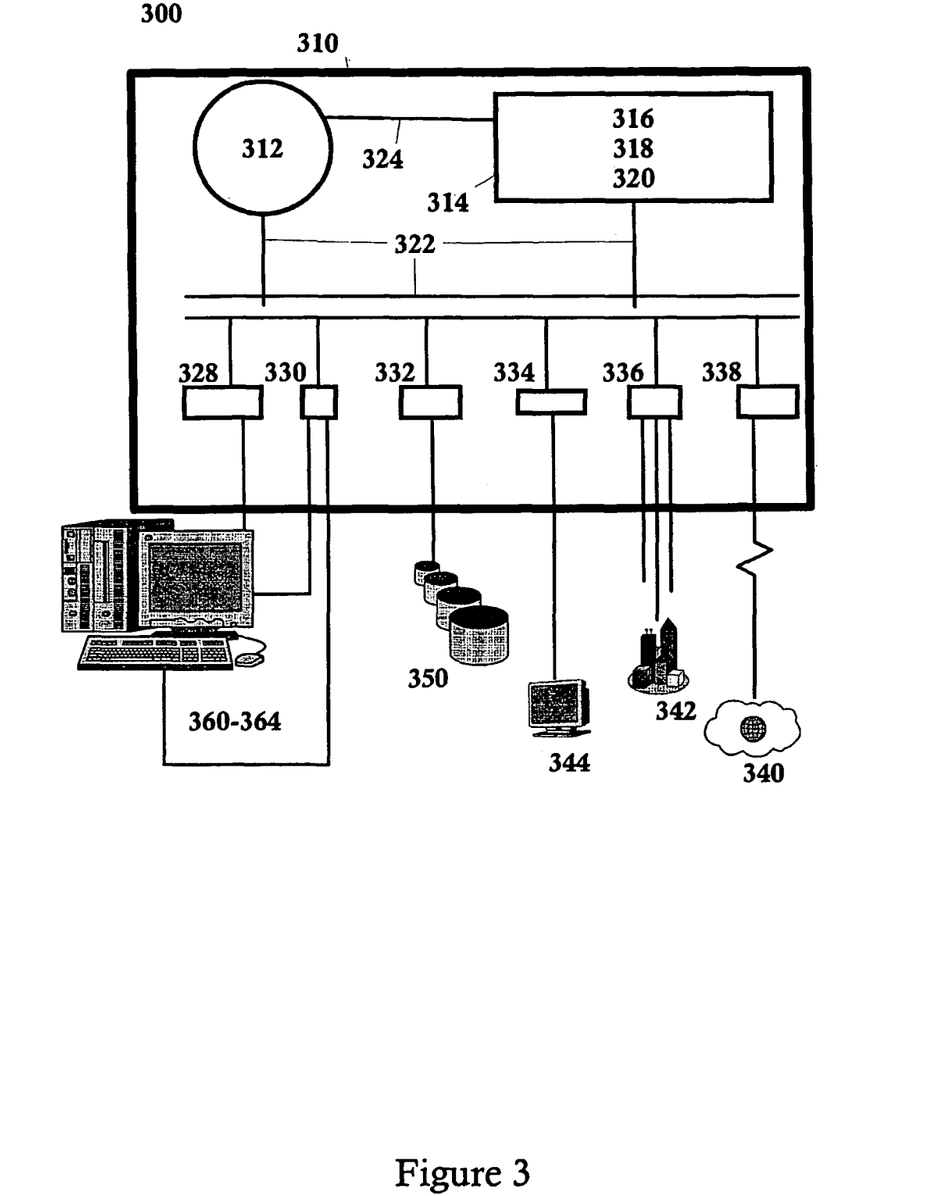
FIG. 3 is a simplified block diagram of a computer network.

Referring to FIG. 3, a high-level block diagram of a computer network system 300 is shown. Computer network system 300 may comprise any number of networked computers 310, each of which may have a central processing unit (CPU) 312, main memory 314, and various digital and/or analog interfaces 328-338. The various devices communicate with each other via internal communications bus 322. CPU 312 is a general-purpose programmable processor, executing instructions stored in memory 314; while a single CPU is shown in FIG. 3, it should be understood that computer systems having multiple CPUs could be used. Communications bus 322 supports transfer of data, commands and other information between different devices, and while shown in simplified form as a single bus, it is typically structured as multiple buses including an internal bus 324 which may connect the CPU 312 directly with memory 314.

Memory 314 is a random-access semiconductor memory for storing data and programs; memory 314 is shown conceptually as a single monolithic entity but it is well known that memory is often arranged in a hierarchy of caches and other memory devices, some or all of which may be integrated into the same semiconductor substrate as the CPU 312. Random access memory (RAM) devices comprising the main storage of computer, as well as any supplemental levels of memory, e.g., cache memories, nonvolatile or backup memories, programmable or flash memories, read-only memories, etc. In addition, memory 314 may be considered to include memory storage physically located elsewhere in computer, e.g., a cache memory in a processor or other storage capacity used as a virtual memory, e.g., as stored on a mass storage device or on another computer coupled to computer via network.

Operating system 316 and applications 318, 320 reside in memory 314. Operating system 316 provides, inter alia, functions such as device interfaces, management of memory pages, management of multiple tasks, etc. as is known in the art. Examples of such operating systems may include Linux, Aix, Unix, Windows-based, OS/400, an RTOS, a handheld operating system, etc. On iSeries and AS/400 machines, OS/400 is the native operating system and object system and IFS is the Unix object system complemented by the Qshell Unix command shell. These and other various applications, components, programs, objects, modules, etc. may also execute on one or more processors in another computer coupled to computer 310 via a network 340, 342, e.g., in a distributed or client-server computing environment, whereby the processing required to implement the functions of a computer program may be allocated to multiple computers 310 over a network 340, 342. Indeed, the invention is equally applicable to any microprocessor device having an operating system as described in the background of the invention in which the microprocessor or processing device is connected across a network to devices having the same or different operating systems. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 318, 320 may include integrated development environments and if a server software application is included, network interface 336, 338 may interact with the server software application to enable computer system 310 to be a network server.

It should be appreciated that computer 310 typically includes suitable analog and/or digital interfaces 328-338 between CPU 312 and the attached components as is known in the art. For instance, computer 310 typically receives a number of inputs and outputs for communicating information externally. For interface with a user or operator, computer 310 typically includes one or more user input devices 360-364, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 310, e.g., some server implementations, might not support direct user input and output. Terminal interface 334 may support the attachment of single or multiple terminals and may be implemented as one or multiple electronic circuit cards or other units. Data storage 350 preferably comprises one or more rotating magnetic hard disk drive units, although other types of data storage, including a tape or optical driver, could be used. For additional storage, computer 310 may also include one or more mass storage devices 350, e.g., a floppy or other removable disk drive, a hard disk drive, a direct access storage device (DASD), an optical drive e.g., a compact disk (CD) drive, a digital video disk (DVD) drive, etc., and/or a tape drive, among others.

Furthermore, computer 310 may include an interface 336, 338 with one or more networks 340,342 to permit the communication of information with other computers 310 coupled to the network 340, 342. Network interface 336,338 provides a physical connection for transmission of data to and from a network 340, 342. The network 340, 342 may be the Internet, as well as any smaller self-contained network such as an Intranet, a wide area network (WAN), a local area network (LAN), or other internal or external network using, e.g., telephone transmissions lines, satellites, fiber optics, T1 lines, public cable, etc. and any various available technologies. One of skill in the art understands that computer system 300 may be connected to more than one network 340, 342 simultaneously. Computer system and remote systems 310 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network 340, 342.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user=s computer and partly on a remote computer or entirely on the remote computer. In the latter scenario, the remote computer may be connected to the user=s computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Thus, a computer user may use such a system as described in FIG. 3 when creating software and then testing and debugging software in an IDE. During the development of software, a developer will often discover that changing a particular aspect or property of an object may either correct or exacerbate a problem. Given that knowledge or insight then, the developer may want to observe or correct other objects having some or all of the same aspects or properties. Thus, while other objects may have the same properties, the values of the properties may differ and a developer may find it useful to compare the values of all objects having the same properties. Object systems, objects of the same or similar type may have the same property viewers and that by discerning all objects having that same property viewer, a software developer, through the use of the object set property viewer described herein, may access other objects having the same properties as the object of interest.

Figure 4:
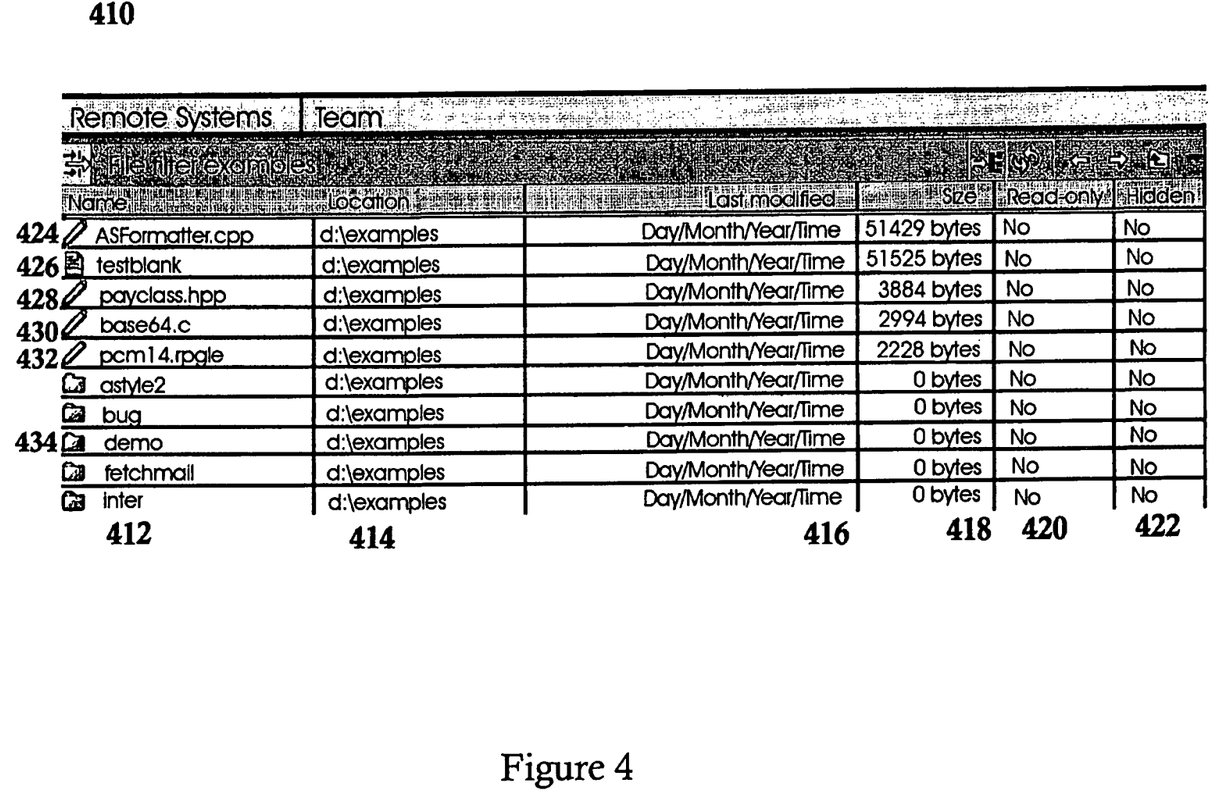
FIG. 4 is a view of the object set property view in accordance with an embodiment of the invention.

With reference to FIG. 4, an object set property viewer 410 is shown that uses already existing APIs, i.e., a content adapter and a property adapter. Each row in the object set property viewer corresponds to a different object in the object set as determined by the content adapter, and the columns of the object set property viewer represent the properties of the objects in the object set, as determined by the property adapter. Listed in column 412 are the names of the objects in the parent object named examples. Columns 414, 416, 418, 420, and 422 provide the property descriptors of different properties or metadata of each of the objects listed. It is important to realize that the properties shown are examples only; there may be other properties that are unique to the object type and other properties still that can be selected by the user. In the hypothetical example, the parent object examples contains the content or child objects ASFormatter.cpp 424, testblank 426, payclass.hpp 428, base64.c 430, pcm14.rpgle 432 and files 434 astyle2, bug, demo, fetchmail, inter. The different columns generated by the object set property viewer described herein then provide a way to compare and manipulate the common properties of these child objects, e.g., column 414 provides the location of the parent object; column 416 lists the date of last modification of the respective object; column 418 provides the size in bytes of the object in that row; and columns 420 and 422 provide other attributes or metadata of the respective object in the row.

Given an object type, the object set property viewer retrieves the children of an object using a content adapter. It is presumed that the children objects of interest have the same property adapter that, along with the descriptors and values of the properties, is also retrieved. The preexisting columns from the property adapters are removed, property descriptors are obtained, new columns are created in the object set property viewer, and the cells in the columns are populated with the values of the properties, along with the inherent functionality accompanying those properties. All of this, moreover, is accomplished in real time, runtime, program time—at the time the user selects the object type and properties to view.

Figure 5:
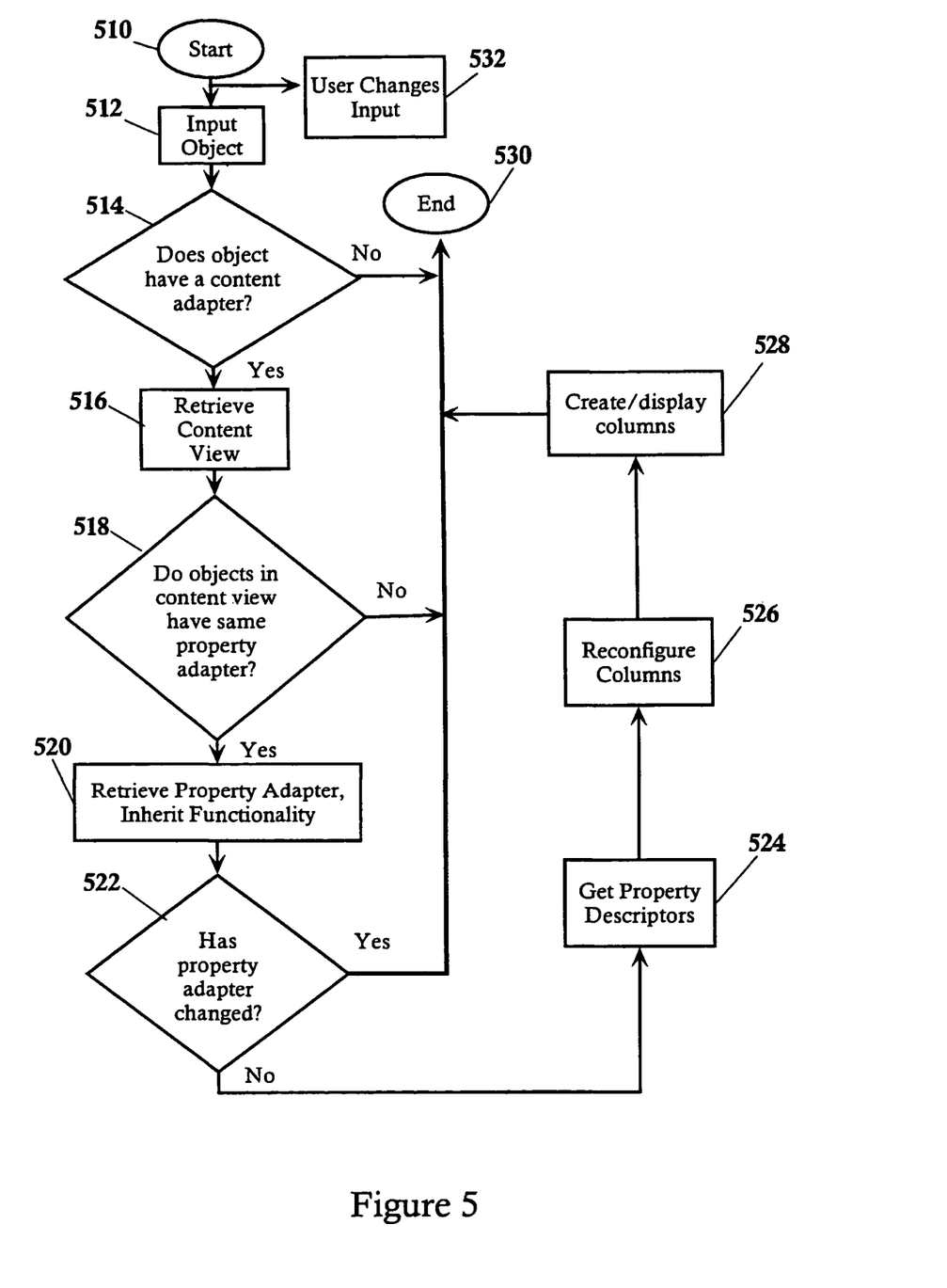
FIG. 5 is a simplified flow chart of a method by which the object set property view can be created and displayed in accordance with an embodiment of the invention.

FIG. 5 is a simplified flow chart by which an object set property viewer can generate an object set property view, such as shown as 410 in FIG. 4. The process begins at step 510 wherein a software developer inputs an object, at step 512, of an object she/he wishes to view. This input can be done by entering the name of the object into a keyboard, a voice response unit, a touch panel display, moving a mouse cursor and highlighting and/or clicking on the object in a traditional graphical user interface having a hierarchical view of files and/or objects, etc. Then, at step 514, the process inquires whether the object has a content adapter, an application program interface that determines the contents of a given object. If the object does have a content adapter, then at step 516, the content adapter is retrieved. At step 518, the object set property viewer determines if any of the contents/children of the object have the same property adapter. The property adapter is an application program interface used to determine the properties and property values of a given object, such as the metadata of a file. If the object does not have a property adapter, then at step 530, the object set property viewer terminates. More interestingly, however, if the children objects do implement the same property adapter, then in step 520, that property adapter is retrieved. In step 522, the object set property viewer checks if the property adapter has been modified. If not, then at step 524, the property descriptors or categories of metadata of the property adapter are retrieved, then reconfigured in 526 for display 528. Examples of how the object set property viewer accomplishes this method are further provided by the code of the Appendix.

One result of the reconfiguration step 526 is the object set property view of FIG. 4 displayed in a table format. To determine the contents of each cell in the table, the object set property viewer uses the content adapter and the property adapter as follows. Each row of the table is dedicated to a different object obtained from the content adapter. Each column in the table displays a property of the object. After determining the content of an object, the object set property viewer then calls the property adapter of the object selected by the user. From the property adapter, each property descriptor is retrieved and a column is created in the table having the descriptor name as a label of the column, and the cells are populated with the values of the different child objects for that particular property descriptor. The columns and/or the cells within the columns may have additional functionality, such as particular positioning, e.g., right- or left-justification of the value in the cell, and/or sorting the values in the column based on a parameter, such as oldest/newest or highest/lowest, etc. The object set property viewer automatically samples each of the properties, and depending upon the nature of the value, the property viewer may select different justifications and different sort algorithms applicable to different properties. For example, the property may be represented as alphanumeric, string characters, Boolean expressions, floating point, etc., and depending upon the nature, the display within the cells may be, for example, left-justified by default, or right-justified, etc. Whatever functionality is inherent in the property adapter, moreover, the object set property viewer also inherits that capability. For example, if a user can edit the values of properties using the property adapter, the object set property viewer also inherits the functionality to edit values of these properties, or if a property adapter allows sorting on properties, so also does the object set property viewer. Thus, a user comparing the values of different properties may edit or sort these properties while displayed with the object set, an especially useful function when viewing lists of errors.

The present invention may be used in an integrated development environment, such as Eclipse, but is not intended to be limited to IDEs. Any user interface of any business, scientific, statistical, system management, and/or database application typically representing objects in a hierarchical structure, but also capable of representing the properties of these objects, especially to compare properties of multiple objects of the same type may take advantage of the object set properties viewer. Viewing objects and their properties as disclosed herein may be used in a software configuration management program and/or if a program generates an error list; in this fashion, a user may compare and contrast errors of the objects of the same type, or alternatively, may compare the same errors of different objects.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

Appendix—Code Comprising the Object Set Property Viewer

Provider:

---

```
* This is the content and label provider for the SystemTableTreeView.
This class is used both to populate the SystemTableTreeView but
also to resolve the icon and labels for the cells in the table/tree.
*
*/
public class SystemTableTreeViewProvider extends
ContainerContentProvider implements ILabelProvider,
ITableLabelProvider
{
  public static final String
    private ListenerList listeners = new ListenerList(1);
```

```
    private Object[ ] __lastResults = null;
    private Object __lastObject = null;
    private SimpleDateFormat__dateFormat = new SimpleDateFormat( );
    /**
     * The cache of images that have been dispensed by this provider.
     * Maps ImageDescriptor->Image.
     */
    private Map imageTable = new Hashtable(40);
    private SystemTableTreeView__view;
    public SystemTableTreeViewProvider(SystemTableTreeView view)
    {
        super( );
        __view = view;
    }
    public void inputChanged(Viewer visualPart, Object oldInput, Object newInput)
    {
    }
    public void setCache(Object[ ] newCache)
    {
        __lastResults = newCache;
    }
    public Object[ ] getCache( )
    {
        return __lastResults;
    }
    public boolean flushCache( )
    {
        if (__lastResults == null)
        {
            return false;
        }
        __lastResults = null;
        return true;
    }
    public boolean isDeleted(Object element)
    {
        return false;
    }
    public Object[ ] getChildren(Object object)
    {
        return getElements(object);
    }
    public Object getParent(Object object)
    {
        return getAdapterFor(object).getParent(object);
    }
    public boolean hasChildren(Object object)
    {
        return getAdapterFor(object).hasChildren(object);
    }
    public Object getElementAt(Object object, int i)
    {
        return null;
    }
    protected ISystemViewElementAdapter getAdapterFor(Object object)
    {
        IAdaptable adapt = (IAdaptable) object;
        if (adapt != null)
        {
            ISystemViewElementAdapter result =
    (ISystemViewElementAdapter) adapt.
    getAdapter(ISystemViewElementAdapter.class);
            result.setPropertySourceInput(object);
            return result;
        }
        return null;
    }
    public Object[ ] getElements(Object object)
    {
        Object[ ] results = null;
        if (object == __lastObject && __lastResults != null)
        {
            return __lastResults;
        }
        else
            if (object instanceof IAdaptable)
            {
                ISystemViewElementAdapter adapter =
    getAdapterFor(object);
                if (adapter != null)
                {
                    results = adapter.getChildren(object);
                    if (adapter instanceof SystemViewRootInputAdapter)
                    {
                        ArrayList filteredResults = new ArrayList( );
                        for (int i = 0; i < results.length; i++)
                        {
                            Object result = results[i];
                            ISystemViewElementAdapter cadapter = getAdapterFor(result);
                            if (!(cadapter instanceof SystemViewPromptableAdapter))
                            {
                                filterredResults.add(result);
                            }
                        }
                        results = filterredResults.toArray( );
                    }
                    __lastResults = results;
                    __lastObject = object;
                }
            }
        if (results == null)
        {
            return new Object[0];
        }
        return results;
    }
    public String getText(Object object)
    {
        return getAdapterFor(object).getText(object);
    }
    public Image getImage(Object object)
    {
        ImageDescriptor descriptor =
    getAdapterFor(object).getImageDescriptor(object);
        Image image = null;
        if (descriptor != null)
        {
            Object iobj = imageTable.get(descriptor);
            if (iobj == null)
            {
                image = descriptor.createImage( );
                imageTable.put(descriptor, image);
            }
            else
            {
                image = (Image) iobj;
            }
        }
        return image;
    }
    public String getColumnText(Object obj, int index)
    {
        if (index == 0)
        {
            // get the first descriptor
            return getText(obj);
        }
        else
        {
            Widget widget = __view.testFindItem(obj);
            if (widget != null)
            {
                TableTreeItem item = (TableTreeItem)widget;
                if (item.getParentItem( ) != null)
                {
                    return "";
                }
            }
            index = index − 1;
            ISystemViewElementAdapter adapter =
    getAdapterFor(obj);
            IPropertyDescriptor[ ] descriptors =
    adapter.getUniquePropertyDescriptors( );
            if (descriptors.length > index)
```

```
                {
                        IPropertyDescriptor descriptor =
descriptors[index];
                        try
                        {
                                Object key = descriptor.getId( );
                                Object propertyValue =
adapter.getPropertyValue(key);
                                if (propertyValue instanceof String)
                                {
                                        return (String) propertyValue;
                                }
                                else if (propertyValue instanceof Date)
                                {
                                        return
__dateFormat.format((Date)propertyValue);
                                }
                                else
                                        if (propertyValue != null)
                                        {
                                                return propertyValue.toString( );
                                        }
                        }
                        catch (Exception e)
                        {
                                e.printStackTrace( );
                        }
                }
                return "";
        }
        public Image getColumnImage(Object obj, int i)
        {
                if (i == 0)
                {
                        return getImage(obj);
                }
                else
                {
                        return null;
                }
        }
        public void addListener(ILabelProviderListener listener)
        {
                listeners.add(Listener);
        }
        public boolean isLabelProperty(Object element, String property)
        {
                return true;
        }
        public void removeListener(ILabelProviderListener listener)
        {
                listeners.remove(listener);
        }
}
```

Sorter:

```
* This class is used for sorting in the SystemTableView.
The sorter determines what and how to sort based on property descriptors.
*
*/
public class SystemTableViewSorter extends ViewerSorter
{
        public static final String
        private boolean __reverseSort;
        private int STRING = 0;
        private int INTEGER = 1;
        private int FLOAT = 2;
        private int __sortFormat;
        private int __columnNumber;
        private StructuredViewer __view;
        public SystemTableViewSorter(int columnNumber,
        StructuredViewer view)
        {
                super( );
                __sortFormat = STRING;
                __reverseSort = false;
                __columnNumber = columnNumber;
                __view = view;
        }
        public boolean isSorterProperty(java.lang.Object element,
java.lang.Object property)
        {
                return true;
        }
        public int category(Object element)
        {
                return 0;
        }
        public int getColumnNumber( )
        {
                return __columnNumber;
        }
        public boolean isReversed( )
        {
                return __reverseSort;
        }
        public void setReversed(boolean newReversed)
        {
                __reverseSort = newReversed;
        }
        public int compare(Viewer v, Object e1, Object e2)
        {
                Object name1 = getValueFor(e1, __columnNumber);
                Object name2 = getValueFor(e2, __columnNumber);
                try
                {
                        Object n1 = name1;
                        Object n2 = name2;
                        if (n1.toString( ).length( ) == 0)
                                return 1;
                        if (isReversed( ))
                        {
                                n1 = name2;
                                n2 = name1;
                        }
                        if (n1 instanceof String)
                        {
                                return ((String) n1).compareTo((String) n2);
                        }
                        else if (n1 instanceof Date)
                        {
                                return ((Date) n1).compareTo((Date) n2);
                        }
                        else if (n1 instanceof Long)
                        {
                                return ((Long) n1).compareTo((Long) n2);
                        }
                        else if (n1 instanceof Integer)
                        {
                                return ((Integer) n1).compareTo((Integer) n2);
                        }
                        else
                        {
                                return collator.compare(n1, n2);
                        }
                }
                catch (Exception e)
                {
                        return 0;
                }
        }
        private Object getValueFor(Object obj, int index)
        {
                ISystemViewElementAdapter adapter = getAdapterFor(obj);
                if (index == 0)
                {
                        return adapter.getText(obj);
                }
                Widget widget = __view.testFindItem(obj);
                if (widget != null)
                {
                        if (widget instanceof TableTreeItem)
                        {
                                TableTreeItem item = (TableTreeItem) widget;
```

```
            if (item.getParentItem( ) != null)
            {
                return "";
            }
        }
    }
    index = index – 1;
    IPropertyDescriptor[ ] descriptors =
adapter.getUniquePropertyDescriptors( );
    if (descriptors.length > index)
    {
        IPropertyDescriptor descriptor = descriptors[index];
        try
        {
            Object key = descriptor.getId( );
            Object propertyValue =
adapter.getPropertyValue(key, false);
            return propertyValue;
        }
        catch (Exception e)
        {
            e.printStackTrace( );
        }
    }
    return "";
}
private ISystemViewElementAdapter getAdapterFor(Object object)
{
    IAdaptable adapt = (IAdaptable) object;
    if (adapt != null)
    {
        ISystemViewElementAdapter result =
(ISystemViewElementAdapter) adapt.
getAdapter(ISystemViewElementAdapter.class);
        result.setPropertySourceInput(object);
        return result;
    }
    return null;
}
}
```

Columns on the Table:

```
 * Used to determine what the columns should be on the table.
 */
public IPropertyDescriptor[ ] getVisibleDescriptors(Object object)
{
    SystemTableViewProvider provider =
(SystemTableViewProvider) getContentProvider( );
    Object[ ] children = provider.getChildren(object);
    if (children != null && children.length > 0)
    {
        IAdaptable child = (IAdaptable) children[0];
        return getAdapter(child).getUniquePropertyDescriptors( );
    }
    return new IPropertyDescriptor[0];
}
public IPropertyDescriptor getNameDescriptor(Object object)
{
    SystemTableViewProvider provider =
(SystemTableViewProvider) getContentProvider( );
    Object[ ] children = provider.getChildren(object);
    if (children != null && children.length > 0)
    {
        IAdaptable child = (IAdaptable) children[0];
        return getAdapter(child).getPropertyDescriptors( )[0];
    }
    return null;
}
/**
 * Used to determine the formats of each descriptor.
 */
private ArrayList getFormatsIn( )
{
    ArrayList results = new ArrayList( );
    SystemTableViewProvider provider =
(SystemTableViewProvider) getContentProvider( );
    Object[ ] children = provider.getChildren(_objectInput);
    if (children != null && children.length > 0)
    {
        IAdaptable child = (IAdaptable) children[0];
        Object adapter =
child.getAdapter(ISystemViewElementAdapter.class);
        if (adapter instanceof ISystemViewElementAdapter)
        {
            ISystemViewElementAdapter ad =
(ISystemViewElementAdapter) adapter;
            ad.setPropertySourceInput(child);
            IPropertyDescriptor[ ] descriptors =
ad.getUniquePropertyDescriptors( );
            for (int i = 0; i < descriptors.length; i++)
            {
                IPropertyDescriptor descriptor =
descriptors[i];
                try
                {
                    Object key = descriptor.getId( );
                    Object propertyValue =
ad.getPropertyValue(key, false);
                    results.add(propertyValue.getClass( ));
                }
                catch (Exception e)
                {
                    results.add(String.class);
                }
            }
        }
    }
    return results;
}
```

Code to Create Columns in View:

```
/**
 * Determines what columns should be shown in this
view. The columns may change anytime the view input *changes.
The columns in the control are modified and columns may be
added or deleted as necessary to make it *conform to the new data.
 */
protected void computeLayout(boolean force)
{
    if (_objectInput == null)
        return;
    IPropertyDescriptor[ ] descriptors =
getVisibleDescriptors(_objectInput);
    IPropertyDescriptor nameDescriptor =
getNameDescriptor(_objectInput);
    int n = descriptors.length; // number of columns we need (name
column + other columns)
    if (nameDescriptor != null)
        n += 1;
    if (n == 0)
        return; // there is nothing to lay out!
    if (descriptors == _uniqueDescriptors && !force)
    {
        setLastColumnWidths(getCurrentColumnWidths( ));
        return;
    }
    _uniqueDescriptors = descriptors;
    Table table = getTable( );
    if (table == null || table.isDisposed( ))
        return;
    // set column attributes, create new columns if necessary
    TableColumn[ ] columns = table.getColumns( );
    int numColumns = columns.length; // number of columns in the
control
    CellEditor editors[ ] = new CellEditor[n];
    String headings[ ] = new String[n];
    String propertyIds[ ] = new String[n];
    ArrayList formats = getFormatsIn( );
    if (formats.size( ) == 0) // DKM - fix exception when no
children
```

-continued

```
        {
            return;
        }
        __layout = new TableLayout( );
        for (int i = 0; i < n; i++)
        { // for each column
            String name = null;
            String propertyId = null;
            CellEditor editor = null;
            int alignment = SWT.LEFT;
            int weight = 100;
            if (i == 0)
            { // this is the first column--treat it special
                name =
SystemPlugin.getString(ISystemConstants.
RESID__PROPERTY__NAME__ROOT + "label");
                propertyId = (String) nameDescriptor.getId( );
                editor = getCellEditor(table, nameDescriptor);
                weight = 200;
            }
            else
            { // these columns come from the regular descriptors
                IPropertyDescriptor descriptor = descriptors[i −
1];
                Class format = (Class) formats.get(i − 1);
                name = descriptor.getDisplayName( );
                propertyId = (String) descriptor.getId( );
                editor = getCellEditor(table, descriptor);
                if (format != String.class)
                    alignment = SWT.RIGHT;
            }
            TableColumn tc = null;
            if (i >= numColumns)
            {
                tc = new TableColumn(table, alignment, i);
                tc.addSelectionListener(__columnSelectionListener);
            }
            else
            {
                tc = columns[i];
                tc.setAlignment(alignment);
            }
            __layout.addColumnData(new Column
WeightData(weight));
            tc.setText(name);
            headings[i] = name;
            editors[i] = editor;
            propertyIds[i] = propertyId;
        }
        setColumnProperties(propertyIds);
        setCellEditors(editors);
        setCellModifier(cellModifier);
        // dispose of any extra columns the table control may have
        for (int i = n; i < numColumns; i++)
        {
            columns[i].dispose( );
            columns[i] = null;
        }
        // compute column widths
        columns = table.getColumns( );
        numColumns = columns.length;
        Rectangle clientA = table.getClientArea( );
        int totalWidth = clientA.width − 5;
        if (numColumns > 1)
        {
            // check if previous widths can be used
            int[ ] lastWidths = getLastColumnWidths( );
            if (lastWidths != null && lastWidths.length ==
numColumns)
            {
                // use previously established widths
                setCurrentColumnWidths(lastWidths);
            }
            else
            {
                // no previous widths or number of columns has
changed - need to calculate
                int averageWidth = totalWidth / numColumns;
                int firstWidth = Math.max(averageWidth, 150);
                averageWidth = (totalWidth − firstWidth) /
(numColumns − 1);
                averageWidth = Math.max(averageWidth, 80);
                columns[0].setWidth(firstWidth);
                for (int i = 1; i < numColumns; i++)
                {
                    columns[i].setWidth(averageWidth);
                }
                setLastColumnWidths(getCurrentColumnWidths( ));
            }
            table.setHeaderVisible(true);
        }
        else
        { // (numColumns == 1) {
            columns[0].setWidth(totalWidth);
            table.setHeaderVisible(false);
        }
    }
```

What is claimed is:

1. A method for displaying objects and properties of the objects in a computer object set, the method comprising:
capturing an input of a selected object to view;
determining if the selected object has a content adapter and if so, retrieving the content view generated by the content adapter;
determining if other objects in the content view have a same property adapter and if so, retrieving the property adapter;
obtaining at least one property descriptor and its corresponding property value of the objects from the property adapter; and
creating an object set property view of the objects and the properties of the objects.

2. The method of claim 1, wherein retrieving the property adapter further comprises inheriting one or more functions, if any, associated with the properties of the selected object.

3. The method of claim 2, wherein one of the inherited functions is the ability to edit the property values in the object set property view.

4. The method of claim 2, wherein one of the inherited functions is the ability to sort the property values in the object set property view.

5. The method of claim 1, further comprising determining if the property adapter has been modified, and if not, then continuing with obtaining at least one property descriptor and its corresponding property value of the objects from the property adapter, and creating the object set property view of the objects and the properties of the objects.

6. The method of claim 1, wherein creating an object set property view of the objects and the properties of the objects further comprises:
creating a row (column) for each object having the same property adapter;
creating a column (row) of a corresponding property of the at least one property descriptor;
populating each cell with a value of the corresponding property pertaining to each object.

7. A method for displaying objects and properties of the objects in a computer object set, the method comprising:
capturing an input of an object to view;
determining if the object has a content adapter and if so, retrieving the content view generated by the content adapter;
determining if other objects in the content view have a same property adapter;
retrieving the same property adapter;
determining that the same property adapter has not been modified;

inheriting the functions of the same property adapter;

selecting those objects in the content view of interest;

obtaining at least one property descriptor and its corresponding property value of the objects from the property adapter;

selecting those property descriptors and corresponding property values of interest; and selecting those functions of interest of the same property adapter.

8. The method of claim 7, further comprising:

creating a row (column) for each selected object having the same property adapter;

creating a column (row) of a corresponding selected property descriptor;

populating a cell with the selected corresponding property value pertaining to each selected object.

9. The method of claim 7, wherein one of the inherited functions is the ability to edit the selected property values.

10. The method of claim 7, wherein one of the inherited functions is the ability to sort the selected property values.

11. A computer program product for displaying objects and properties of the objects in a computer object set, the computer program product comprising:

a computer readable medium having computer readable program code embodied therein, the computer readable program code comprising:

computer readable program code configured to receive inputs of a selected object in a computer object system;

computer readable program code configured to retrieve a content adapter of the selected object;

computer readable program code configured to determine the content of the selected object;

computer readable program code configured to determine if the content has one or more children objects having the same property adapter;

computer readable program code configured to retrieve the same property adapter for the children objects;

computer readable program code configured to obtain the property descriptors and the property values of a plurality of properties of the children objects;

computer readable program code configured to create a view wherein selected ones of the children objects and selected ones of the plurality of properties for each of the selected child objects are displayed.

12. The computer program product of claim 11, further comprising computer readable program code configured to inherit a plurality of functions, one or more functions associated with selected ones of the plurality of properties.

13. The computer program product of claim 12, wherein one of the inherited plurality of functions is the capability to edit the property values of the selected properties.

14. The computer program product of claim 12, wherein one of the inherited plurality of functions is the capability to sort the property values of the selected properties.

15. An object set property viewer in a computer system having an object system, comprising:

means for selecting an object by a user;

means for retrieving the children of the object, wherein the means for retrieving the children of the object is a call to a preexisting application program interface comprising a content adapter;

means for determining which children of the object have the same properties, wherein the means for determining which children have the same properties further comprises means for inspecting the application program interfaces comprising a property adapter of each child and selecting those children having the same property adapter; and means for displaying the objects and the properties.

16. The object set property viewer of claim 15, further comprising means for inheriting one or more functions of the same property adapter.

* * * * *